E. WORSLEY.
MACHINE FOR GRANULATING MOIST MATERIAL.
APPLICATION FILED OCT. 6, 1920.

1,390,256.

Patented Sept. 6, 1921.
2 SHEETS—SHEET 2.

UNITED STATES PATENT OFFICE.

ERNEST WORSLEY, OF BLACKLEY, ENGLAND, ASSIGNOR TO G. F. WILDE LIMITED, OF STOCKPORT, ENGLAND, A COMPANY, OF ENGLAND.

MACHINE FOR GRANULATING MOIST MATERIAL.

1,390,256.  Specification of Letters Patent.  Patented Sept. 6, 1921.

Application filed October 6, 1920. Serial No. 415,148.

*To all whom it may concern:*

Be it known that I, ERNEST WORSLEY, a British subject, residing at Blackley, city of Manchester, England, have invented certain new and useful Improvements in Machines for Granulating Moist Material, of which the following is a specification.

This invention relates to improvements in apparatus for granulating or mixing moist material.

It consists of a disk rotating between two stationary disks or rings and carrying a number of cups or receptacles to receive the material and feed it to the point of contact of the rotating disk with a sieve where the latter will force the material through the interstices of the sieve.

Figure 1:
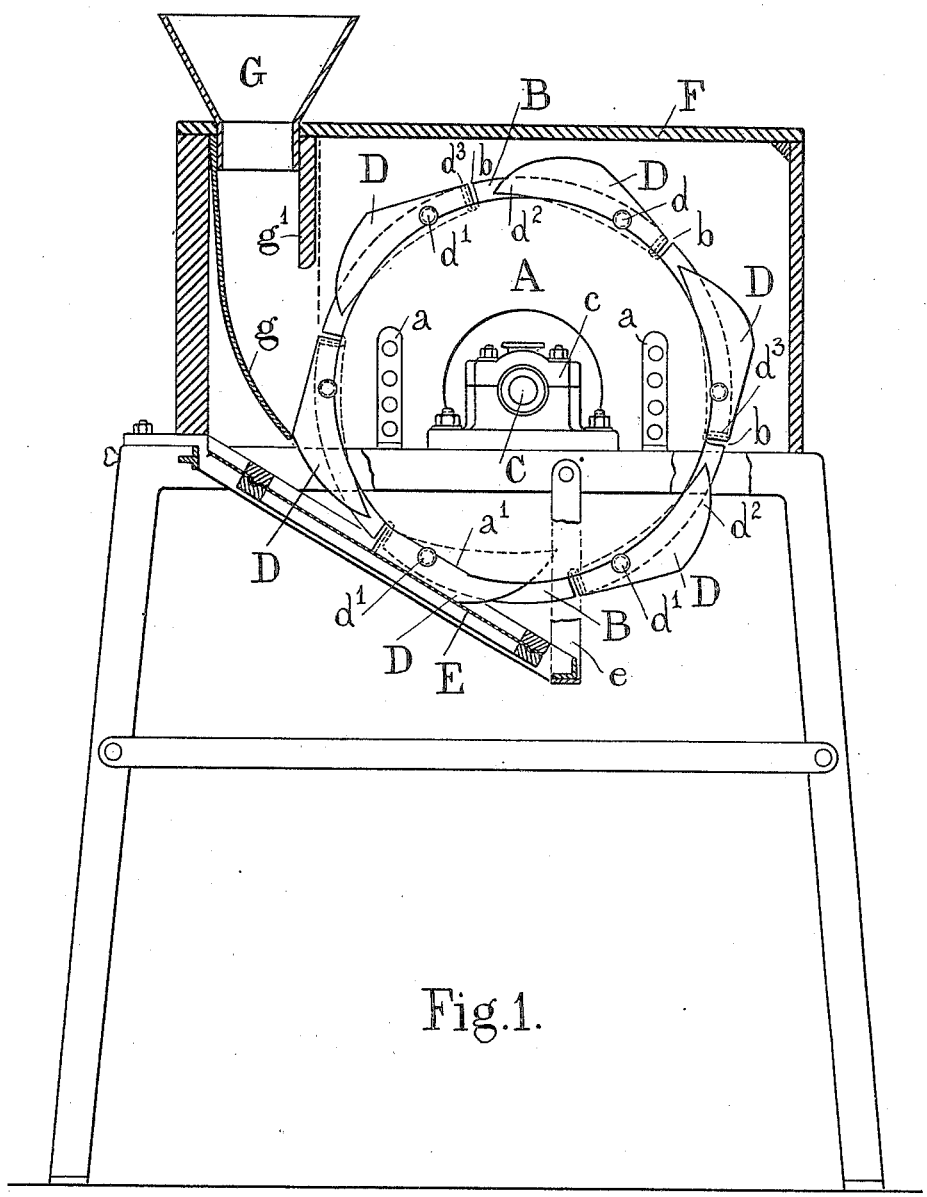

The invention will be fully described with reference to the accompanying drawings:

Figure 1, side elevation of the machine with the casing F in section.

Figure 2:
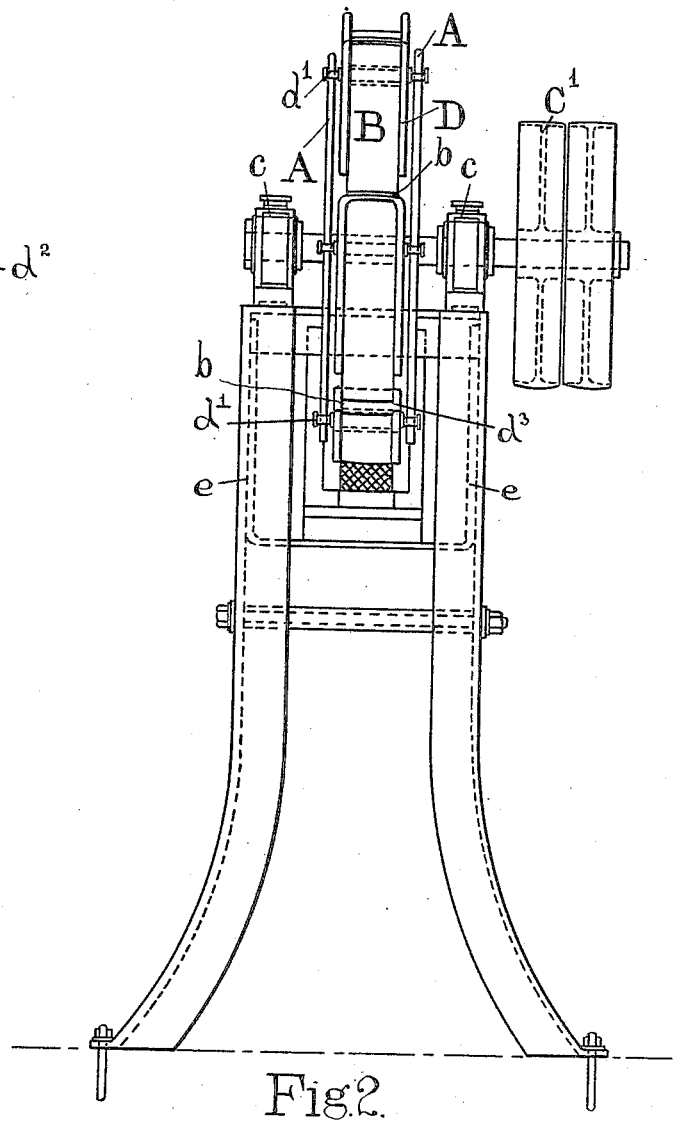

Fig. 2, front elevation of the machine with the casing removed.

Figure 3:
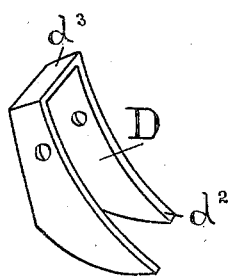

Fig. 3, perspective view of cup D.

The machine is constructed with two stationary disks or rings A supported on brackets $a$ and a rotating disk B keyed or otherwise affixed to the shaft C. The shaft C is supported on bearings $c$ and is provided at one end with a fast and loose pulley C'. A number of cups or receptacles D are pivotally mounted on the disks B near the periphery thereof and the pivots $d$ are extended to form runners $d'$ which engage with the peripheries of the disks or rings A.

The cups or receptacles D are heavier at the forward end portion $d^2$ than the rear portion $d^3$ and so shaped that they will receive the material fed into the machine and convey it to the point of contact of the disk B with the sieve E. The sides of each of the cups or receptacles D are arranged at the sides of the disk B and the back of the rear portion $d^3$ extends across the disk being contained in a slot $b$ formed therein to receive it.

The sieve E is arranged below and to one side of the disk B and is carried on brackets or supports $e$. The whole apparatus is completely inclosed in a suitable casing, F, and the material is fed in through the chute or hopper G, being guided to the cups or receptacles D by the guide plates $g$ $g'$.

In Fig. 2 the apparatus is shown with the casing F removed.

In operation the material is fed in through the hopper G and is received by each succeeding cup or receptacle D as it passes thereunder, and is conveyed by the cup or receptacle to the point of contact of the disk B with the sieve E. As the cup or receptacle D approaches this point the forward end thereof is gradually pushed toward the center of the disk by the contact of the edges of the sides $d^2$ with the sieve or the frame of the sieve until when the actual point of contact is reached the sides $d^2$ do not extend above the surface of the disk B. To facilitate this movement the pivot $d$ of the cup or receptacle is very loose in the disk B and a flat $a'$ is formed on the periphery of each of the disks A about the point of contact. After each cup or receptacle has passed the point of contact the forward end swings out again by the action of the centrifugal force as the forward end is heavier than the rear end.

What I claim as my invention and desire to protect by Letters Patent is:—

1. In apparatus for granulating or mixing moist material the combination of two stationary rings of a disk rotating between them, a plurality of cups pivotally mounted on said disk to receive the material and means coöperating with the said disk to produce a granulating action.

2. In apparatus for granulating or mixing moist material, the combination with two stationary rings of a disk rotating between them, a plurality of cups pivotally mounted on said disk to receive the material and a sieve in contact with the disk to which the material is fed by the cups.

3. In apparatus for granulating or mixing moist material, the combination with two stationary rings of a disk rotating between them, a plurality of cups pivotally mounted on said disk to receive the material, a sieve in contact with a point on the disk to which the material is fed by the cups, runners on the pivots of the cups, a flat on each of stationary rings to be engaged by the said runners to cause the latter to move toward the center of the disk as they approach the point of contact thereof with the sieve and slots in disk to receive the rear ends of the cup.

In testimony whereof I have hereunto set my hand in presence of two subscribing witnesses this 21st day of September, 1920.

E. WORSLEY.

Witnesses:
GEO. H. O'BRIEN,
CATHARINE WOODHEAD.